Sept. 10, 1963   A. G. ZULIANI   3,103,081
DEVICE FOR KILLING BIRDS
Filed May 7, 1962
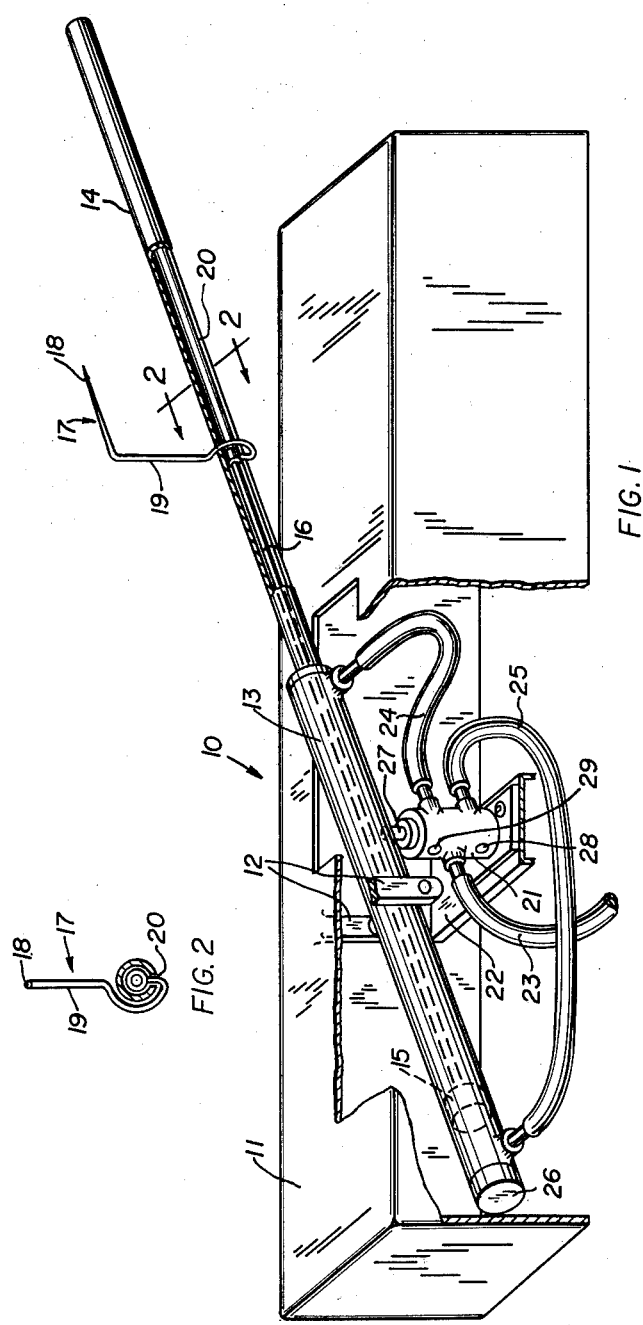
INVENTOR
ANTONIO G. ZULIANI
BY— *Smart & Biggar*
ATTORNEYS.

United States Patent Office 3,103,081
Patented Sept. 10, 1963

3,103,081
DEVICE FOR KILLING BIRDS
Antonio Germano Zuliani, 2591 Howard Lane,
Windsor, Ontario, Canada
Filed May 7, 1962, Ser. No. 192,671
Claims priority, application Canada Mar. 9, 1962
2 Claims. (Cl. 43—79)

This invention relates to a device for killing birds. There are a large number of pest birds which do considerable damage in agricultural areas and which constitute a danger to air travel, particularly when present in large numbers in the vicinity of air fields. The bird killing device of the present invention is intended to successively kill birds without requiring any human attendance for removal of the killed birds or resetting of the device after it has killed a bird.

The bird killing device of the invention generally comprises a supporting frame, an air cylinder pivotally mounted within said supporting frame, a hollow perch bar rigidly secured to one end of said air cylinder and extending therefrom with its axis parallel to that of the air cylinder, a piston slidably mounted within said cylinder, a rod connected to said piston and extending longitudinally of the cylinder and the hollow perch bar to terminate at a point within said perch bar, a stabbing device rigidly attached to the free end of the rod, a four-way air valve disposed below said air cylinder, and means for delivering air under pressure through said valve to one or the other end of said air cylinder, said air valve being provided with a valve-actuating stem disposed so as to be depressed by said air cylinder whenever said perch is depressed, whereby the air pressure will normally urge the piston in one direction but will urge it in the opposite direction whenever said perch is depressed.

The attached drawings illustrate a preferred embodiment of the invention:

FIGURE 1 being a perspective view of the device with parts of it broken away so as to better illustrate its construction; and FIGURE 2 being a cross-section view taken on the line 2—2 in FIGURE 1 looking in the direction of the arrows.

Considering the drawings in greater detail, reference numeral 10 generally indicates a supporting frame having a top 11. A pair of brackets 12 extend downwardly from the top 11 and pivotally mount, at points intermediate its ends, a cylindrical air cylinder 13. A hollow perch bar 14 extends coaxially from one end of air cylinder 13. A piston 15 is longitudinally slidably mounted within air cylinder 13, and a piston rod 16 is rigidly attached to the piston 15. Piston rod 16 extends longitudinally within the cylinder 13 and perch bar 14 and terminates at a point within the hollow perch bar. A stabbing device 17, consisting of a sharpened prong 18 and a supporting arm 19, is rigidly attached to the free end of the piston rod 16, and a longitudinal slot 20 is provided in the perch bar to accommodate the arm 19 and enable it and the prong 18 to follow movements imparted to the piston rod 16 by the piston 15.

A four-way air valve 21 of conventional design is mounted below the air cylinder 13 by means of a crossbar 22 constituting a part of the supporting frame 10, and an air-line 23 is provided whereby air under pressure may be directed into the four-way air valve 21. An air line 24 extends between the upper end of the four-way air valve 21 and the upper end of the air cylinder 13, and an air line 25 extends between the lower end of the air valve and the lower end of the air cylinder. A valve actuating stem 27 extends upwardly from the four-way air valve 21 and is normally biased upwardly so as to locate a slidable valving member (not shown) to which the valve actuating stem is attached in a raised position which establishes communication between the air line 23 and the air line 24 leading into the upper end of air cylinder 13, while at the same time establishing communication between air-line 25 and an exhaust port 28 in air valve 21. The air valve 21 is however, so located beneath the air cylinder 13 that whenever the upper end of the air cylinder is tipped downwardly it will contact and depress the valve stem 27, whereupon the air line 23 will be taken out of communication with air line 24 and brought into communication with air line 25, and air line 24 will be brought into communication with an exhaust port 29 in the air valve 21.

While the point of pivotal mounting of the air cylinder 13 in the brackets 12 is adjacent the point of balance of the cylinder-perch bar unit, the point of pivotal mounting is slightly displaced from the point of balance so that the air cylinder perch bar unit will tend to rotate counter-clockwise (as viewed in FIGURE 1) until restrained from further rotation by contacting a part of the supporting frame. In this connection I prefer to provide a counterweight 26 at the lower end of the air cylinder 13. When the air cylinder is allowed to assume its normal position after rotating until it contacts a part of the supporting frame, the piston valve actuating stem will be in its normal raised position establishing communication between air lines 23 and 24. Air under pressure can now flow through line 23, valve 21 and line 24 into the upper end of the air cylinder 13, thereby driving piston 15 rearwardly to a position in which the piston rod, and hence the prong 18, are fully retracted.

When, however, a bird lands on the perch bar 14 its weight will suffice to depress the perch bar and hence the upper end of the air cylinder 13. This depression of the air cylinder will depress the valve actuating stem 27, establishing communication between the air lines 23 and 25, and forcing the piston 15 forwardly. The forward travel of the piston 15 is of course accompanied by forward movement of the piston rod 16 and the stabbing device 17, resulting in impalement of the perching bird by the prong 18.

In experimental use of a device of the type described above, I have found that, contrary to expectations, the device consistently resets itself after each performance of its bird-killing function. It would appear that when a bird is impaled by the stabbing device 17 it will, though mortally wounded, live long enough to struggle free of the prong 18 and leave the perch bar. Removal of the weight of the bird allows the perch bar to rise, whereupon the valve actuating stem is returned to its normal position so that air can once again flow through line 24 to retract the piston 15, thereby resetting the stabbing device 17.

Any suitable, bait, lure or decoy may be employed to attract birds to the perch bar 14.

What I claim as my invention is:

1. A device for killing birds comprising a supporting frame, an air cylinder, means attached to such supporting means for pivotally mounting said air cylinder, a hollow perch bar rigidly secured to one end of air cylinder and extending co-axially therefrom, a piston slidably mounted within said cylinder, a rod connected to said piston and extending longitudinally of the cylinder and the hollow perch bar to terminate at a point within said perch bar, said rod being slidable relative to said cylinder and hollow perch bar so as to be reciprocable therewithin as said piston is reciprocated within said cylinder, a stabbing device rigidly attached to the free end of the rod, said perch bar being slotted longitudinally to permit sliding of the stabbing device relative to the perch bar when said rod is reciprocated within said perch bar, a four-way air valve provided with two exhaust ports, said valve being disposed below said cylinder, and means for delivering air under pressure through said valve to one end or the other end of said air cylinder while permitting the escape of air from said cylinder through one of said exhaust ports, said air valve being provided with a valve-actuating stem disposed so as to be depressed by said air cylinder whenever said perch is depressed, whereby the air pressure will normally urge the piston in one direction but will urge it in the opposite direction whenever said perch is depressed.

2. A device for killing birds comprising a supporting frame, an air cylinder, means attached to said supporting frame for pivotally mounting said air cylinder, a hollow perch bar rigidly secured to one end of said air cylinder and extending co-axially therefrom, a piston slidably mounted within said cylinder, a rod connected to said piston and extending longitudinally of the cylinder and the hollow perch bar to terminate at a point within said perch bar, a stabbing device rigidly attached to the free end of the rod, an air valve body mounted below said air cylinder, means for delivering air under pressure to said air valve body, a first air line connecting one end of said air valve body with one end of said air cylinder, a second air line connecting the other end of said air valve body to the other end of said air cylinder, a valve mounted within said air valve body and movable between a first position in which it directs the air delivered to said air valve body to said first air line and a second position in which it directs the air delivered to said air valve body to said second air line, said air valve body including a pair of exhaust ports to provide for the escape of air displaced from said air cylinder by sliding movement of said piston therewithin, and a stem attached to said valve and extending upwardly from said air valve body to a point below said air cylinder, whereby, when said air cylinder is pivoted downwardly, the air cylinder will contact and depress said stem, thereby moving said valve from said first position to said second position.

References Cited in the file of this patent
UNITED STATES PATENTS

| | | | |
|---|---|---|---|
| 968,523 | Barney | Aug. 30, | 1910 |
| 1,845,212 | Allen | Feb. 16, | 1932 |
| 2,923,285 | Salles | Feb. 2, | 1960 |